(12) United States Patent
McGrane

(10) Patent No.: US 6,760,760 B1
(45) Date of Patent: Jul. 6, 2004

(54) CONTROL SYSTEM COMMUNICATION SERVER FOR TRANSMITTING FILES VIA MULTIPLE COMMUNICATION PATHS

(75) Inventor: William B. McGrane, Dallas, TX (US)

(73) Assignee: AMX Corporation, Richardson, TX (US)

(*) Notice: Subject to any disclaimer, the term of this patent is extended or adjusted under 35 U.S.C. 154(b) by 375 days.

(21) Appl. No.: 09/589,577

(22) Filed: Jun. 7, 2000

Related U.S. Application Data

(60) Provisional application No. 60/138,378, filed on Jun. 9, 1999.

(51) Int. Cl.[7] ............................................. G06F 15/16
(52) U.S. Cl. ..................... 709/219; 709/208; 709/224; 714/48; 700/275; 700/276
(58) Field of Search ..................... 700/275; 709/219, 709/208, 224; 714/48

(56) References Cited

U.S. PATENT DOCUMENTS

| | | | |
|---|---|---|---|
| 5,446,740 A | | 8/1995 | Yien et al. |
| 5,592,626 A | | 1/1997 | Papadimitriou et al. |
| 5,996,022 A | * | 11/1999 | Krueger et al. ............. 709/247 |
| 6,161,145 A | * | 12/2000 | Bainbridge et al. ......... 709/246 |
| 6,167,567 A | * | 12/2000 | Chiles et al. ................. 717/11 |
| 6,175,920 B1 | * | 1/2001 | Schanze ....................... 713/150 |
| 6,241,156 B1 | * | 6/2001 | Kline et al. ................. 236/49.3 |
| 6,260,069 B1 | * | 7/2001 | Anglin .......................... 709/229 |
| 6,338,152 B1 | * | 1/2002 | Fera et al. ..................... 714/48 |
| 6,360,270 B1 | * | 3/2002 | Cherkasova et al. ........ 709/229 |
| 6,363,422 B1 | * | 3/2002 | Hunter et al. ................ 709/224 |
| 6,434,680 B2 | * | 8/2002 | Belknap et al. ............. 711/161 |
| 6,553,418 B1 | * | 4/2003 | Collins et al. .............. 709/224 |

FOREIGN PATENT DOCUMENTS

| | | |
|---|---|---|
| WO | WO 97/44747 | 11/1997 |
| WO | WO 99/05584 | 2/1999 |

OTHER PUBLICATIONS

F. Halsall, "Data Communications, Computer Networks and Open Systems," Addison–Wesley, p. 45–46 and 285–292, (1996).

Tilo Klesper, "Der Internet–Zugriff aufs LON / Weltweiter Zugriff auf die Sensorik und Aktorik von Automatisierungs—Projekten," Elektronik (Germany), vol. 47 (No. 8), p. 60, 62, 64 and 66–68, (Aug. 1998).

Peter M. Corcoran, et al., "Browser–Style Interfaces to a Home Automation Network," IEEE Transactions on Consumer Electronics, IEEE Inc. (New York), vol. 43 (No. 4), p. 1063–1069, (Nov. 1, 1997).

* cited by examiner

*Primary Examiner*—Hosain Alam
*Assistant Examiner*—Liang-che Wang
(74) *Attorney, Agent, or Firm*—Gardere Wynne Sewell LLP

(57) ABSTRACT

A communication system includes a communication server having a file storage cache, at least one control system coupled to the communication server via a communication path, and at least one client application in communications with the communication server. The communication server is operable to transmit files between the at least one client application and the at least one control system.

7 Claims, 2 Drawing Sheets

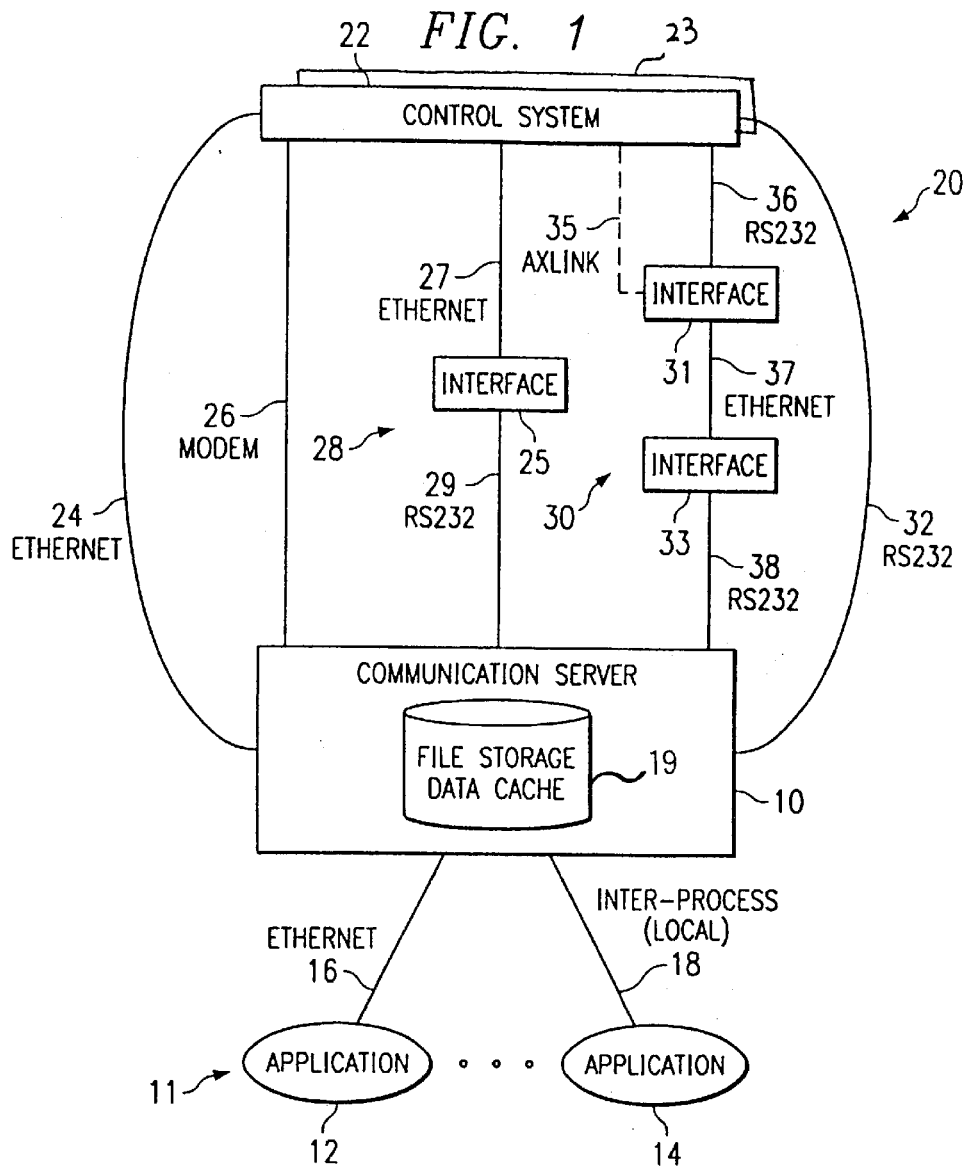
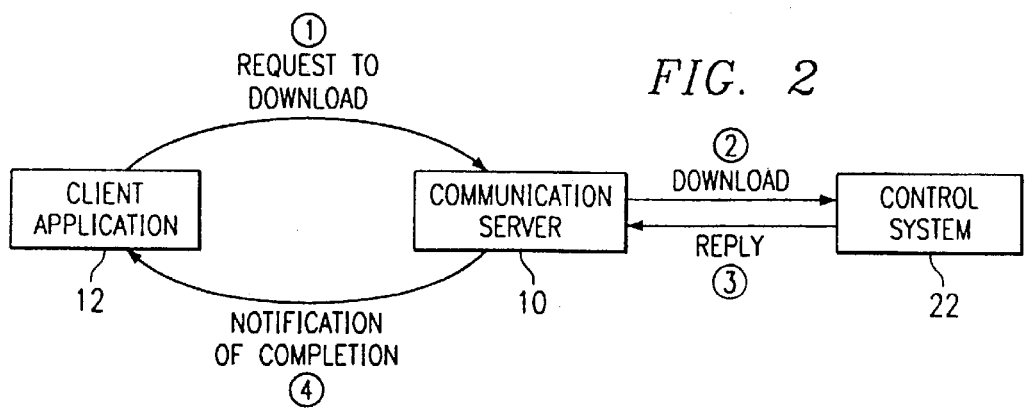

US 6,760,760 B1

CONTROL SYSTEM COMMUNICATION SERVER FOR TRANSMITTING FILES VIA MULTIPLE COMMUNICATION PATHS

This application claims the benefit of U.S. Provisional Application No. 60/138,378 filed Jun. 9, 2000 under 35 U.S.C. 119(e).

TECHNICAL FIELD OF THE INVENTION

This invention is related in general to the field of control systems, and more particularly, to a control system communications server.

RELATED APPLICATION

This patent application is related to co-pending Provisional U.S. application entitled System and Method of an Internet Control Network, serial no. 60/131,605, filed Apr. 29, 1999 (Attorney Docket No. 066287.0103).

BACKGROUND OF THE INVENTION

A control system typically includes a variety of controlled devices and a master controller linked by a network. In a fully automated environment, appliances that change the various parameters of the environment can be linked to a control area network (CAN) and a computer-based controller. The appliances may include heating, ventilation and air conditioning (HVAC) systems, lighting systems, audio-visual systems, telecommunications systems, security systems, surveillance systems, and fire protection systems, for example. One or more easy-to-use user interface, such as a touch panel, may be electronically linked to the control area network to accept user input and display current system status. AMX Corporation of Dallas, Tex. designs and manufactures such networked appliance control systems.

SUMMARY OF THE INVENTION

It has been recognized that it is desirable to provide a communication server that establishes a pathway to one or more control systems to enable bi-directional transfer of data and files.

In one aspect of the invention, a communication system includes a communication server having a file storage cache, a control system coupled to the communication server via a communication path, and at least one client application in communications with the communication server. The communication server is operable to transmit files between the at least one client application and the control system.

In another aspect of the invention, a method of communicating with a control system includes the steps of sending a download request from a client application to a communication server, the request identifying a file to be downloaded, a download date and time, a communication path, and a destination control system. Next, the file is downloaded by the communication server to the control system at the requested date and time via the specified communication path to the destination control system, and the client application is notified by the communication server that the file download is completed.

In yet another aspect of the invention, a method of communicating with a control system includes the steps of sending an upload request from a client application to a communication server, the request identifying a file to be uploaded, a communication path, and a origination control system. Next, the file is uploaded from the control system via the specified communication path to the communication server, and the client application is notified by the communication server that the file upload is completed. Thereafter, the file is transferred from the communication server to the client application when initiated by the file application.

One technical advantage of the invention is that the client applications are freed from the details of communicating with the control systems, and that the client applications are not tied up during a lengthy data transfer. Further, communication with the control system is synchronized even when the requests are asynchronous. Multiple clients may now communicate with a single control system simultaneously and schedule the data transfer. Data transfers can occur unattended and scheduled to take place at any time.

BRIEF DESCRIPTION OF THE DRAWINGS

For a better understanding of the present invention, reference may be made to the accompanying drawings, in which:

FIG. 1 is a simplified block diagram of a communication server linked to a control system via a number of possible routes according to the teachings of the present invention;

FIG. 2 is a block diagram showing download data flow between the communication server, control system, and client application according to the teachings of the present invention;

DETAILED DESCRIPTION OF THE INVENTION

Figure 3:
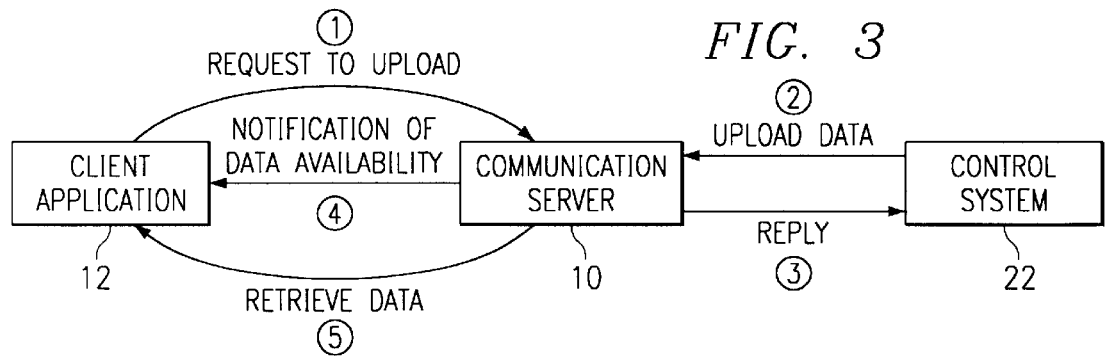
FIG. 3 is a block diagram showing upload data flow between the communication server, control system, and client application according to the teachings of the present invention.

FIG. 1 is a simplified block diagram of a communication server 10 linked to one or more control systems 22 and 23 via a number of possible routes 20 according to the teachings of the present invention. Communication server 10 is coupled to or in communication with a number of client applications 11, including at least one client application 12 which may be linked thereto by an Ethernet link 16. At least one client application 14 may be co-located with communication server 10 on the same platform and therefore may communicate therewith via an inter-process communications protocol 18. Communication server 10 includes a file storage data cache 19.

Communication server 10 may be coupled to one or more control systems 22 via an Ethernet link 24, a modem dial-up link 26, and/or an RS-232 link 32. Communication server 10 may also be coupled to control system 22 by a combination of communication links, such as a link 28 consisting of Ethernet 27 and RS-232 29 with an interface 25 therebetween; and a link 30 consisting of RS-232 36, Ethernet 37, and a second RS-232 link 38 with interfaces 31 and 33. One or more AxLinks 35, a proprietary communications link and protocol of AMX Corporation of Dallas, Tex., may couple in parallel with one or more links between communication server 10 and control system 22. Therefore, communication server 10 and control system 22 include the hardware, software, and configuration data to bi-directionally communicate, transmit and receive data via one or more of the links shown. Therefore, communication server 10 may communicate with control system 22 using hardware and protocols such as Internet protocol (IP) over Ethernet, RS-232, modem interface, or proprietary bus protocols. It may be noted that the types of links shown in FIG. 1 are examples and that other means of communication are contemplated by the present invention. In operation, client applications 11 may poll communication server 10 for available routes to a specific control system and then request to establish a communication session via a selected route.

FIG. 2 is a block diagram showing download data flow between the communication server 10, control system 22, and client application 12 according to the teachings of the present invention. In step 1, a client application 12 sends communication server 10 a request to download a file or some other information. The file may be a data file, a configuration file, an executable file, or any other information that is destined for control system 22. The request may be accompanied by the file to be downloaded and generally includes one or more parameters:

1. a control system identifier, a communication route to use and necessary transport parameters;
2. date and time to begin the download;
3. data to download or its location;
4. where to send completion notification.

It may be seen that the download date and time may differ from the request date and time. Client application 12 may download one or more files to communication server 10 and schedule them for a batch download at a specified date and time. The downloaded files may be stored in file storage data cache 19 awaiting a transfer to control system 22. Communication server 10 may either determine a preferred communication route to the specified control system by looking it up in a table or receive instructions contained in the request. Alternatively, communication server 10 may display a list of available routes to control system 22 to allow a user to select the route to use. Communication server 10 then establishes communication with the specified control system using the specified path and transport parameters. For example, communication server 10 may initiate a communication session using an IP address of the specified control system at the requested date and time. Communication server 10 then downloads the specified file to control system 22 in step 2. Control system 22 sends communication server 10 a reply in step 3. Steps 2 and 3 may be repeated for the transfer of each block of data, the transfer of a file, or both. At the end of the download session, communication server 10 sends a notification of completion to client application 12 in step 4.

Operating in this manner, client application 12 may send the data to be downloaded to communication server 10 to be temporarily stored in file storage data cache 19 at any time that is convenient for the client application. Communication server 10 then completes the download at the requested date and time. Typically, the data transfer rate for downloading to the control system is substantially slower than that between the client application and the communication server. Therefore, using the communication server as an intermediary for the data transfer frees up the client application from the time-consuming download to the control system.

FIG. 3 is a block diagram showing upload data flow between communication server 10, control system 22, and client application 12 according to the teachings of the present invention. A client application 12 sends communication server 10 a request to upload data in step 1. The file may be a data file, a configuration file, an executable file, or any other information that is destined for client application 12. The request may include one or more parameters:

1. a control system identifier, a communication route to use and necessary transport parameters;
2. date and time to begin the upload, if applicable;
3. data to upload, its location, or a description of the data to be uploaded;
4. where to send upload data.

It may be seen that the upload date and time may differ from the request date and time. Communication server 10 then establishes communication with the specified control system using the specified path and transport parameters at the requested date and time. Communication server 10 then uploads the specified file from control system 22 in step 2. Communication server 10 sends control system 22 a reply in step 3. Steps 2 and 3 may be repeated for the transfer of each block of data, the transfer of a file, or both. At the completion of the upload session, communication server 10 sends a notification of data availability to client application 12 in step 4. Client application 12 then retrieves the uploaded data from communication server 10 in step 5.

Operating in this manner, client application 12 may retrieve the uploaded data from communication server 10 at any time that is convenient for the client application. Typically, the data transfer rate for uploading data from the control system is substantially slower than that between the client application and the communication server. Therefore, the client application may upload the data, perhaps using file transfer protocol (FTP), at any time that is convenient and at a faster speed. This method also eliminates the need for the client application to stay connected to the communication server during the data transfer from the control system to the communication server.

Figure 4:
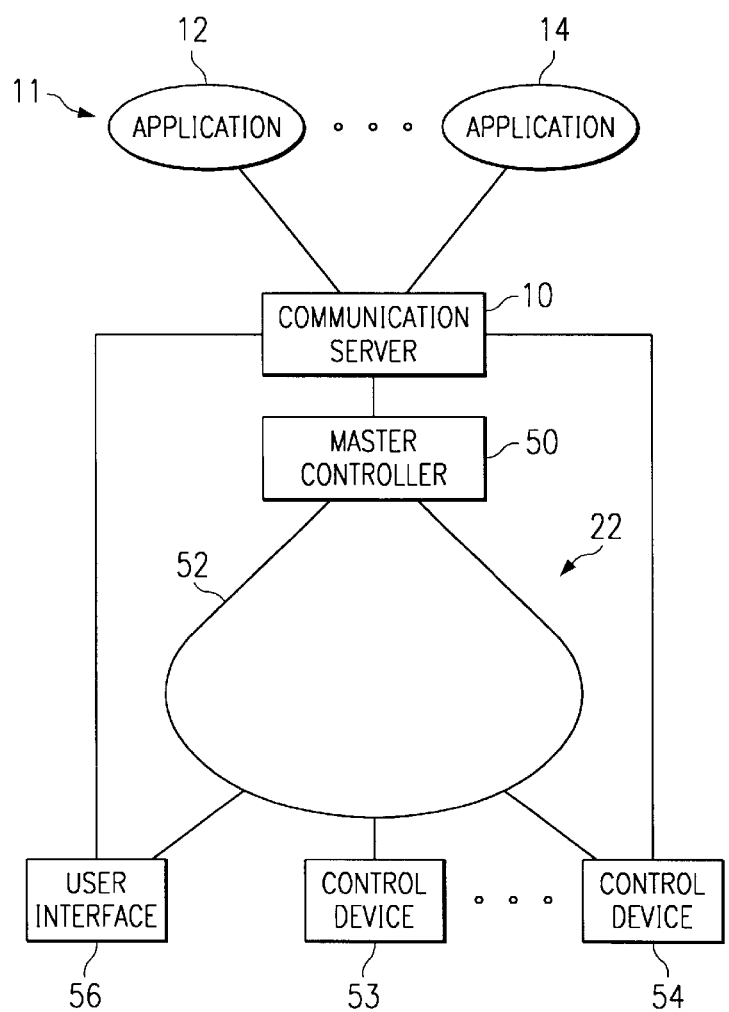
FIG. 4 is a more detailed block diagram of the connections between the communication controller and control system.

FIG. 4 is a more detailed block diagram of the connections between communication server 10 and control system 22. Note that communication server 10 may be coupled to more than one control systems and coordinate file transfers to and from each of them. Client applications 11, including remote applications 12 and local applications 14, are in communications with communication server 10. Communication server 10 may be coupled to control system 22 via a direct link to a master controller 50 or a direct link to user interface 56. Communication server 10 may also directly couple to one or more control device 53 and 54 via a direct link, such as IP over Ethernet. Control system 22 further includes a plurality of control devices 53 and 54 coupled to a control area network 52 and under the control and management of master controller 50. Master controller 50 may serve as a central distribution point and is operable to transfer the downloaded files to its intended destination in the control system or retrieve a file to be uploaded from a specified location in the control system. Files may be transferred to and from user interface 56 via master controller 50 or via a direct route to user interface 56.

Control area network 52 is a local area network operating under transport protocols such as Ethernet, and AXLink and PhastLink of AMX Corporation (Dallas, Tex.) that interconnect a variety of devices, appliances and/or equipment. The underlying network connectivity may be wired, wireless, power line carriers, or any suitable transmission medium. Coupled to control area network 52 are a plurality of devices, appliances and/or equipment, including user interface 56, master controller 50, and control devices 53 and 54. Some devices may be coupled to the control area network via additional intermediate communications devices, such as an RS-232 controller (not shown).

User interface device 56 is any device that is capable of receiving user input and displaying or indicating control network status. For example, a touch panel, a computer terminal with a monitor, keyboard and pointing device, and any device with similar functionalities may serve as user interface 56.

Master controller 50 is generally a CPU-based controller that controls the communications among user interface 56 and the control devices. It is operable to receive user inputs received by user interface devices, such as commands, and instruct the appropriate Internet appliance to act according to the command. Master controller 50 may also poll each device periodically to monitor its status. The system status and/or the status of each device may be sent to control area network user interface devices for display.

Control devices 53 and 54 are devices that can receive commands from master controller 50 and operate or act according to the command. Control devices 53 and 54 may include equipment that affect or monitor the various parameters of the premises. For example, control device 53 and 54 may include heating and air conditioning, lighting, video equipment, audio equipment, sprinklers, security cameras, infrared sensors, smoke detectors, etc. in a residential or commercial control area network. Household appliances, such as a hot tub, fireplace, microwave oven, coffee maker, etc. may also be Internet appliances coupled to the network. Control devices 53 and 54 may also be capable of providing a current status of its operational state to master controller 50, such as on/off, temperature settings, current ambient temperature, light intensity settings, volume settings, threshold settings, and predetermined alphanumeric strings reflective of operational states.

Control systems, including the master controllers, control devices and user interfaces, are identified by unique identifiers. For example, a control system may be identified by a system identifier, and components within a control system may be further identified by device identifiers. The communication protocols may be message-based and provide for the delivery of the data to its intended destinations. Any suitable communication protocol may be used for this purpose.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method of communicating with a control system, comprising the steps of:

sending a download request from a client application to a communication server over a first communication path, the request respectively identifying a file to be downloaded, a download time, a second communication path, and a destination control system;

transmitting the file to be downloaded from the client application to the communication server over the first communication path;

downloading the file from the communication server to the destination control system at the requested time over the identified second communication path;

notifying the client application by the communication server and the first communication path that the file download is completed;

sending an upload request from the client application to the communication server over the first communication path, the request respectively specifying a file to be uploaded, a second communication path, and an origination control system;

uploading the specified file from the origination control system over the specified second communication path to the communication server, said specified file having an associated file application;

notifying the client application by the communication server that the file upload is completed; and transferring the specified file from the communication server to the client application when initiated by the file application.

2. The method of claim 1 wherein:

said requested download time is selectively delayed from the time at which said download request is sent.

3. The method of claim 1, wherein;

the second communication path is an Ethernet link.

4. The method of claim 1, wherein;

the second communication path is an RS-232 link.

5. The method of claim 1, wherein;

the second communication path is a modem dial-up link.

6. The method of claim 1, wherein;

the second communication path is a combination of an Ethernet link and an RS-232 link.

7. The method of claim 1, wherein;

the second communication path is a combination of one or more Ethernet links and one or more RS-232 links.

* * * * *